United States Patent

Kullman

[15] 3,700,856
[45] Oct. 24, 1972

[54] HINGED SURFACE HEATING UNIT SYSTEM

[72] Inventor: William G. Kullman, Bloomingdale, Ill.

[73] Assignee: General Electric Company

[22] Filed: Dec. 20, 1971

[21] Appl. No.: 209,922

[52] U.S. Cl. .................219/451, 219/456, 219/463
[51] Int. Cl. ...............................................H05b 3/68
[58] Field of Search......219/447, 448, 451, 452, 455, 219/453, 456, 463, 467

[56] References Cited

UNITED STATES PATENTS

| | | |
|---|---|---|
| 2,792,486 | 5/1957 | Fry..........................219/451 X |
| 2,839,656 | 6/1958 | Weyrick.....................219/451 |
| 2,988,625 | 6/1961 | Hart...........................219/456 |
| 3,002,079 | 9/1961 | Smith et al..................219/451 |
| 3,227,856 | 1/1966 | Hurko et al................219/463 |
| 3,384,736 | 5/1968 | Nowosielsky..............219/456 |
| 3,384,735 | 5/1968 | Linger.......................219/456 |

Primary Examiner—Volodymyr Y. Mayewsky
Attorney—Richard L. Caslin et al.

[57] ABSTRACT

A surface heating unit in combination with a remote selector switch that controls the flow of current to the heating unit. A metal sheathed heating means of coiled configuration is provided with hinging means for mounting the heating unit in an opening in a cooktop so that food soils may be cleaned from therebeneath. A trim ring surrounds the heating means and supports the same for slight vertical movement therebetween. A utensil support framework comprising a series of ring members is telescoped with the heating means and is attached to the trim ring. A choke cable is connected between the selector switch and the heating means so that the changing of the selector switch from an ON position to its OFF position acts to lower the heating means out of contact with a utensil carried by the utensil support framework and vice versa.

8 Claims, 4 Drawing Figures

PATENTED OCT 24 1972  3,700,856
SHEET 2 OF 2
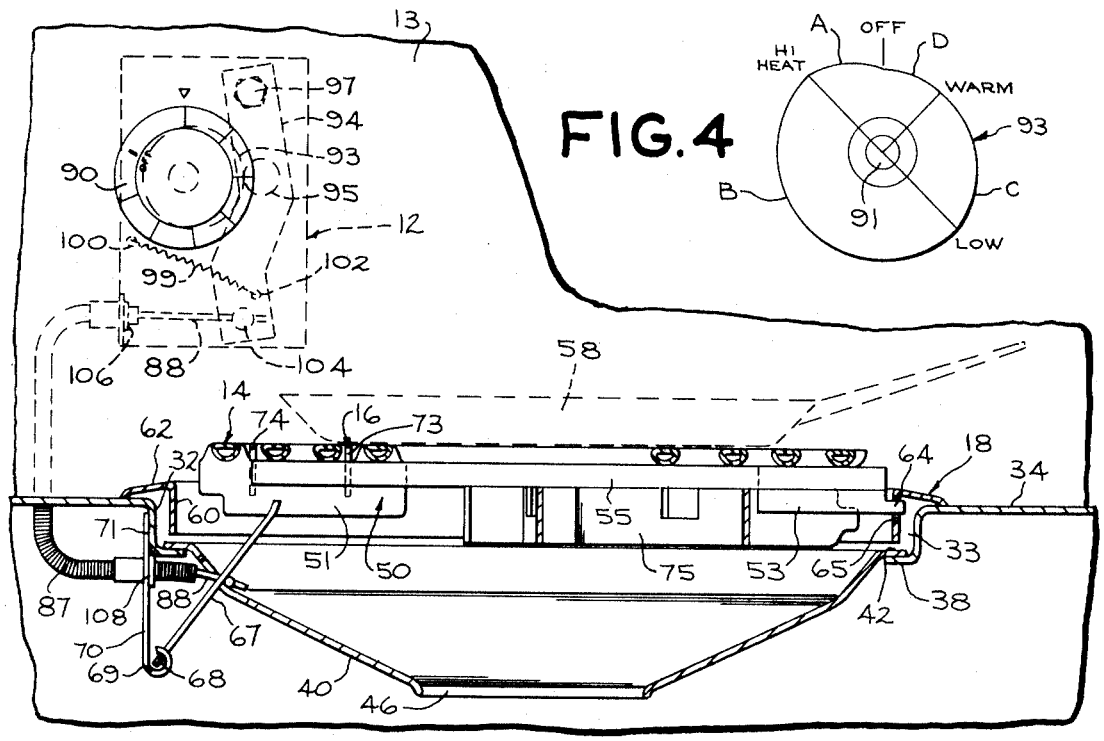
FIG.4
FIG.3
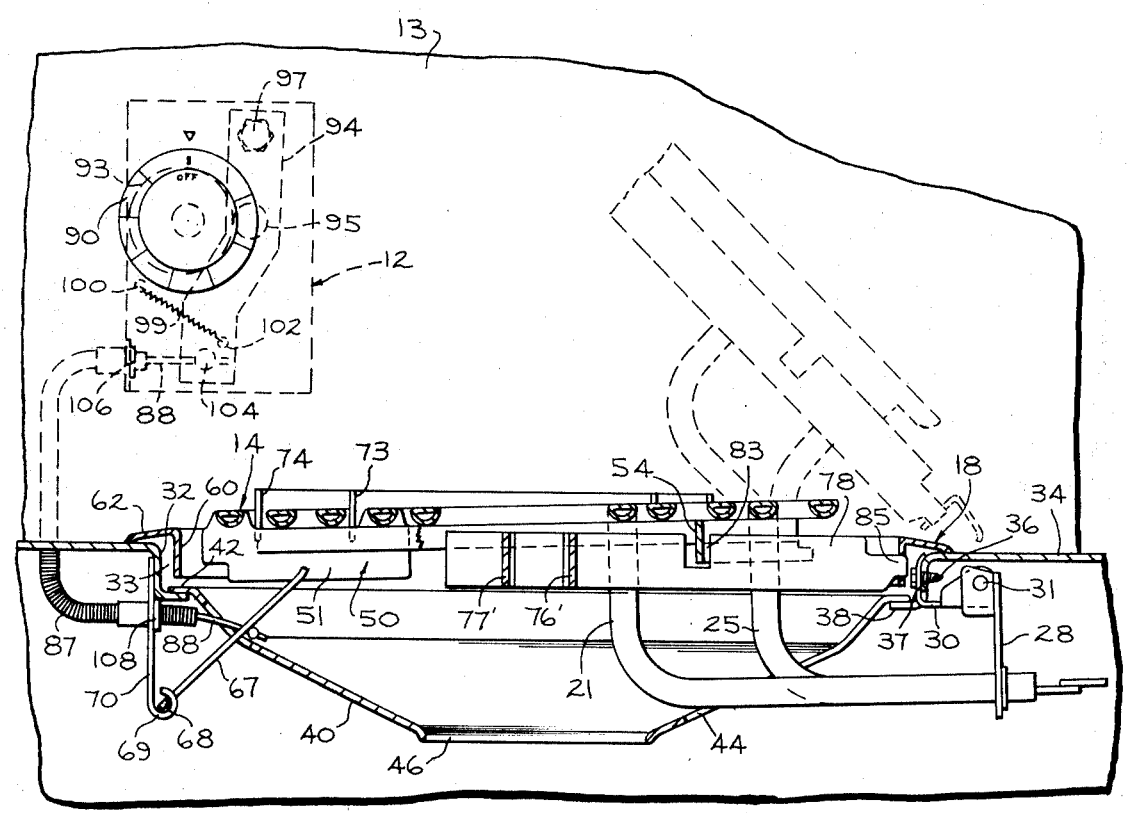
FIG.2

HINGED SURFACE HEATING UNIT SYSTEM

BACKGROUND OF THE INVENTION

One of the differences between a gas surface burner and an electric surface heating unit is that the presence of a gas flame provides an instantaneous heat source, and when the gas burner is turned off the heat source is instantaneously removed. This is to be compared with an electrical resistance heater that is encased in a metal sheath that is filled with an electrical insulating material that is also thermally conductive, such as magnesium oxide. Such tubular heating elements have a gradual heat-up rate and they constitute a relatively large thermal mass or stored heat that continues to conduct heat to the cooking utensil after the flow of current is discontinued to the heater. Thus, when a utensil is supported on an electric heating unit and the unit's selector switch is turned to an OFF position; for example, after water in the utensil were to come to a boil, the boiling action would continue for awhile before gradually dropping off to room temperature. In other words, there is a gradual heat-up rate and a gradual cool-down rate for an electric surface heating unit as compared with the instantaneous action of a gas surface burner.

This gradual cool-down rate can be speeded up by taking the heating element out of contact with the utensil when the unit's selector switch is turned to its OFF position.

This invention is an improvement over the Linger U.S. Pat. No. 3,384,735 and the Nowosielski U.S. Pat. No. 3,384,736, both of which are assigned to the General Electric Company, the assignee of the present invention. These two prior patents do not afford an opportunity of raising the heating unit out of the way for cleaning food soils from therebeneath.

The principle object of the present invention is to provide a hinged or displaceable surface heating unit system that incorporates both a fixed utensil support means and an electrical heating element telescoped therewith, where the element is capable of slight vertical movement with respect to the utensil support, there being a connection between a unit's selector switch and the heating element such that when the switch is set to its open position the heating element will be lowered beneath the utensil support member and thus out of contact with the cooking utensil.

A further object of the present invention is to provide a hinged surface heating unit system of the class described with a novel utensil support member that is capable of supporting a variety of sizes of cooking utensils without danger of overturning.

A further object of the present invention is to provide a hinged surface heating unit system that is capable of being raised for cleaning food spillage therebeneath, with the inclusion of a utensil support member of generally concentric rings that is separable from the heating element whereby the heating element is capable of slight vertical adjustment with respect to the utensil support so that when the unit's selector switch is opened, the heating element will be lowered below the utensil support member thereby breaking the conductive path between the heating element and the bottom of the utensil so that the stored heat in the heating element is convected to the atmosphere and not conducted into the utensil.

SUMMARY OF THE INVENTION

The present invention, in accordance with one form thereof, relates to a surface heating unit system with a coiled heating element in combination with a remote selector switch. The heating element may be raised for cleaning food soils from therebeneath. A trim ring surrounds the heating element and carries a utensil support member that is telescoped between adjacent turns of the heating element. The heating element is supported on a spider from the trim ring that allows the heating element to move vertically a slight amount with respect to the utensil support member. A selector switch for the heating unit is provided with a flexible cable means joining the switch to an elevator member underlying the heating element so that when the switch is set in an OFF position, the cable acts upon the elevator member to lower the heating element beneath the top surface of the utensil support member.

BRIEF DESCRIPTION OF THE DRAWINGS

This invention will be better understood from the following description taken in conjunction with the accompanying drawings and its scope will be pointed out in the appended claims.

FIG. 2 is a transverse, cross-sectional, elevational view taken through the center of the surface heating unit on the line 2—2 of FIG. 1 showing the relative position of the heating element with respect to the utensil support member when the selector switch is set to its OFF position and the heating element drops out of contact with the utensil.

FIG. 3 is another cross-sectional, elevational view somewhat similar to that of FIG. 2 except that it is taken on an angular plane on the line 3—3 of FIG. 1 that generally parallels one side of the spider that supports the heating element, and showing the elevated position of the heating element when the selector switch is closed to energize the heating element.

FIG. 4 is a layout of the cam of the selector switch showing the various angular shapes conforming to the various settings of the selector switch knob.

DESCRIPTION OF THE PREFERRED EMBODIMENT

Figure 1:
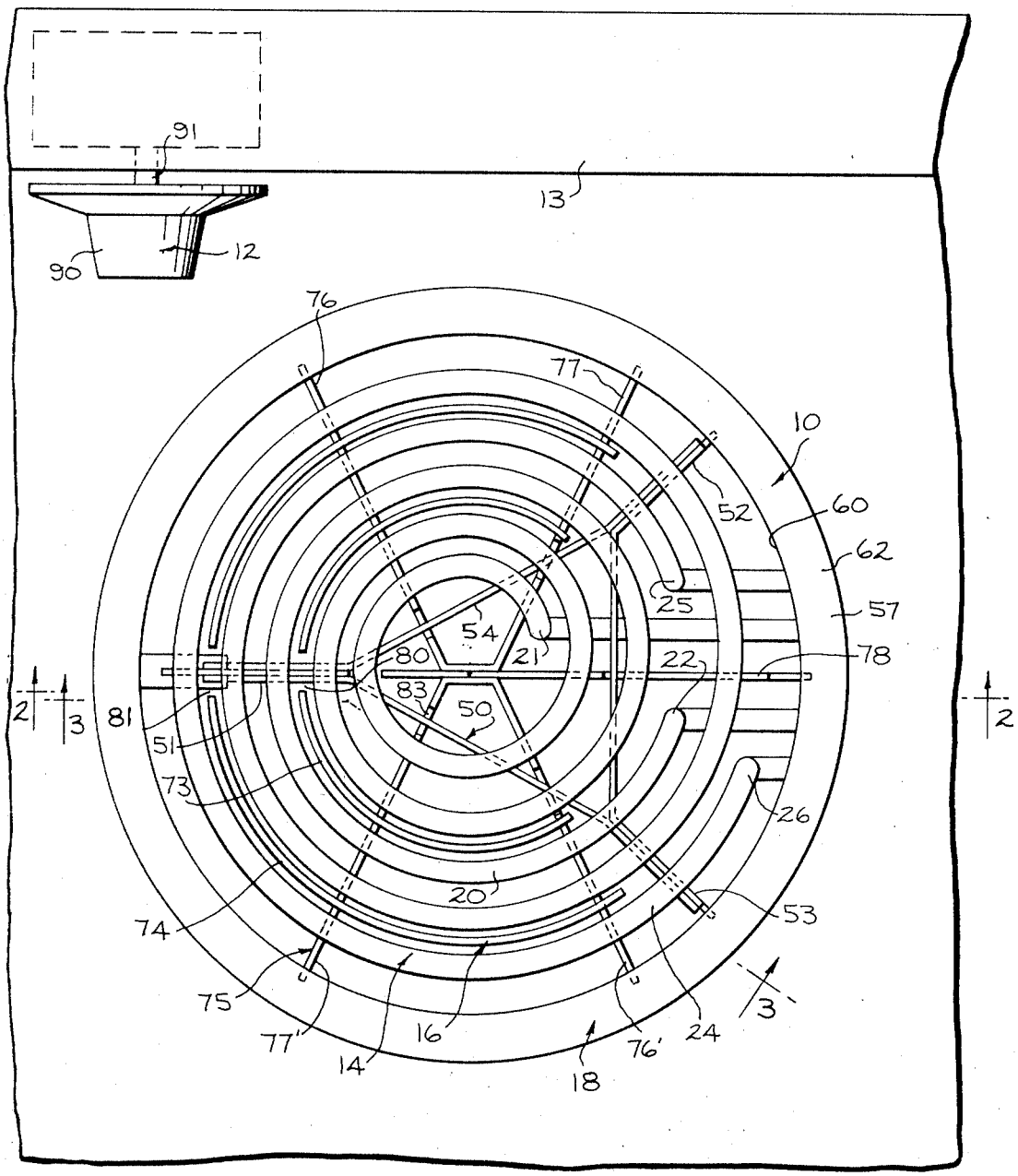
FIG. 1 is a top plan view of a surface heating unit system comprising the present invention mounted in an opening in a cooktop, there being a control panel located behind the unit with the unit's selector switch mounted therein.

Turning now to a consideration of the drawings, and in particular to the plan view of FIG. 1, there is shown a surface heating unit system comprising the surface heating unit 10 and a selector switch 12 mounted in the front control panel of a backsplash 13 for controlling the flow of current to the unit. The heating unit comprises a metal sheathed electrical resistance heating element 14, a utensil support member 16 telescoped within the heating element and a trim ring 18 surrounding both the heating element and the utensil support member. The heating element 14 is of coiled configuration of rather standard design. It may be a single heating element or it may have as many as three separate elements that are wound together to give varying areas of heating surface, such as small, medium and large. FIG. 1 shows a modification with two separate heating elements; namely, an inner element 20 having an innermost terminal 21 and an intermediate terminal 22, while there is an outer heating element 24 having two terminals 25 and 26. As is best shown in FIG. 2, the heating element terminals extend vertically downward and then horizontally outward.

These terminals are bunched together at their ends and a mounting plate 28 is slipped over the free ends and a suitable attachment is made to only one terminal of each heating element such as by crimping so that expansion and contraction of the elements can take place during the heat-up and cool-down of the elements without putting undue stresses on the heating elements as is conventional in this art. A suitable hinge bracket 30 is connected at one end to the mounting plate 28 by means of a hinge pin 31. This bracket is adapted to be mounted at its other end to the vertical flange 32 of a recessed opening 33 in a supporting cooktop 34 by means of a mounting screw 36 that is threaded through a suitable opening 37 in the side wall. This mounting bracket 30 and hinge pin 31 is so located that it is possible to pivot the heating element 14 into a raised position by as much as a 45° angle, as is shown in dotted lines in FIG. 2, so that it is possible to reach a hand down through the opening 33 in the cooktop and clean out any food soils that might have accumulated therebeneath.

The vertical flange 32 of the recessed opening 33 has a narrow ledge 38 on which is seated a concave reflector pan or bowl 40. This reflector pan may be of stainless steel or aluminum, and it has a narrow upper peripheral flange 42 that is adapted to be seated on the narrow ledge 38. The side of the reflector pan 40 near the mounting bracket 30 and mounting plate 28 is provided with a large cutout 44 that extends nearly from the bottom to its upper peripheral edge 42 to avoid interference with the heater terminals 21, 22, 25 and 26 of the two heating elements 20 and 24 and to permit the raising of the heating unit for cleaning therebeneath. The bottom portion of the reflector pan 40 is provided with a large central opening 46 to allow any food spillage to drain from the pan and not accumulate therein. The drawings do not show a metal surface beneath the cooktop 34, but there would be such a surface present for receiving any food spillage draining through the reflector pan opening 46. This food spillage must be removed periodically and this is done by raising the heating unit 10 and removing the reflector pan 40 so as to reach with the hand through the opening 33 and wiping the food soils away.

Looking at the top plan view of FIG. 1, the two heating elements 20 and 24 are shown supported on an open A-frame or spider 50 that is shown with three widely spaced radial arms 51, 52 and 53. A minimum number of attachments are made between the spider 50 and the various coils 20 and 24 of the heating element 14 so as not to set up undue stresses in the elements at high temperatures. These radial arms are connected together by a triangular body or central portion 54. Turning to the cross-sectional, elevational view of FIG. 3 which generally parallels the near side of the spider 50, it will be noted that each radial arm, such as 51 and 53, is of rather deep section, and that the radial arms are connected together by a narrow strip 55 which constitutes the central or body section 54 and is welded to the radial arms to form a unitary member or spider 50.

A trim ring of stainless steel or the like is arranged to surround the heating element 14 to improve the appearance of the surface heating unit as well as to provide a transition piece or ramp that facilitates the sliding of a cooking utensil 58 on and off the elevated heating element 14 with relation to the cooktop 34. Such a trim ring 18 is of angular shape in transverse cross-section having a vertical ring 60 and an outwardly directed top flange 62. The vertical ring 60 is adapted to fit closely within the recess 33 of the cooktop 34, while the outward flange 62 is adapted to overlie the peripheral edge of the cooktop 34 that surrounds the recess. The two radial arms 52 and 53 of the spider 50 that are closest to the hinging means are connected to the trim ring 18 with a loose, lost motion action, as is best seen in FIG. 3. The radial arm 53 is shown with an outward extension 64 which is confined within a vertical elongated slot 65 in the vertical ring 60 of the trim ring 18. The third radial arm 51 of the spider 50 is not connected to the trim ring 18, but instead is supported from beneath by an elevator member 67 that is a simple flat clip member that is hinged at its lower end 68 within a bearing 69 at the lower end of a bracket member 70 that is suspended from the cooktop by being welded to the back side of the vertical flange 32. The purpose of this elevator member 67 is to control the elevation of the heating element 14 with relation to the utensil support member 16.

This utensil support member 16 is best seen in the plan view of FIG. 1 as comprising a pair of concentric ring members 73 and 74 which are telescoped between adjacent turns of the heating element 14. These ring members 73 and 74 are supported on an open framework 75 that is generally of X-shape having opposite radial arms 76, 76', 77 and 77'. There is one additional radial arm 78 that is generally in alignment with the plane of the radial arm 51 of the spider 50 that supports the heating element 14. The utensil support member 16 is assembled to the heating element 14 from below. The objective is to telescope the utensil support member 16 within the heating element 14 such that the top surface of each member may be flush, as is best seen in FIG. 3, during normal cooking operations. Looking at FIG. 1, it is noted that each ring member 73 and 74 is blanked out as at 81 respectively adjacent the radial arm 51 so as to prevent any interference therebetween. Moreover, the two rings 73 and 74 stop short of the two radial arms 52 and 53 of the spider 50. Moreover, the radial arms 76, 76', 77 and 77' are each formed with a notch in their top edge underlying the triangular central portion 54 of the spider 50 as at 83, again to prevent interference between the two members in their vertical relative movement therebetween. This notch 83 is also seen in FIG. 2 between the radial arm 78 and the strip 54 of the spider. Notice that this radial arm 78 of the utensil support member 16 is attached to the trim ring 18 by means of an extending finger 85 received by a mating slot in the vertical ring 60 of the trim ring 18. This same type of fixed connection is made between all of the radial arms of the utensil support member with the trim ring 18 such that the utensil support member is fixed with respect to the trim ring 18. It is only the heating element 14 that is capable of a slight vertical movement with respect to both the trim ring and the utensil support member 16.

It is desirable to coordinate the action of the selector switch 12 with the elevation of the heating element 14. It is the objective to position the top surface of the heating element 14 flush with the top surface of the utensil support rings 73 and 74 whenever the selector switch is closed to energize the heating element. This condition is illustrated in FIG. 3. Moreover, it is desirable to lower the heating element 14 when the selector switch 12 is opened to de-energize the heating element 14 and this condition is illustrated in FIG. 2. In the preferred embodiment, this objective is met by joining a push-pull cable or choke cable 87 with a movable core 88 between the selector switch 12 and the elevator member 67. Thus, the closing of the selector switch 12 applies tension to the cable core 88, thereby raising the elevator member 67 which in turn lifts the entire heating element 14 about the hinge axis 31 to the position shown in FIG. 3. The selector switch 12 has a control knob 90 as seen in FIG. 1 that is mounted on a shaft 91. On the same shaft 91 is a cam member 93 that is located within the switch housing. There is a pivoted lever 94 that is provided with a cam follower or roller 95 for engagement with the cam 93. This lever 94 is pivoted about a hinge point 97 at one end, and it is acted upon by a tension spring 99 at its other end. This spring is fastened at one end 100 to the housing of the switch 12, and at its other end 102 to a point adjacent the free end of the lever 94. The core 88 of the choke cable 87 is fastened to the lever at 104 which is near the point 102. The sheath of the cable is fixed at one end to the switch housing at 106 and at its other end to the bracket 70 at 108.

Having described my invention of a novel and practical hinged surface heating unit system, it will readily be apparent to those skilled in this art that I have designed a system such that when the selector switch is turned to OFF, heat stops flowing into the cooking utensil by breaking the heat flow path. Moreover, the lost motion connection of the radial arms 52 and 53 in the vertical elongated slots 65 in the trim ring 18 serves to ensure that the heating element 14 remains level for best contacting the bottom wall of the utensil. The elevator member 67 is not susceptible to sticking during use due to its simplicity of design and the tension spring 99 provides a positive biasing force. The utensil support member 16 is braced or reinforced by a rigid open framework 75 that is connected to the trim ring 18 such that it may not expand or warp when heated up to interfere with the slight vertical movement of the heating element 14. The entire heating unit 10 is locked together through the trim ring 18 so that manufacturing problems are reduced by eliminating the need for special gauges to assemble the heating unit to the cooktop. While I have chosen to illustrate my invention in combination with a hinged surface heating unit, it will be understood that the invention could be incorporated in a plug-in surface unit or otherwise displaceable heating unit for enabling the cleaning of food soils from therebeneath. Another advantage of the present invention is that it enables the extension of the temperature limits of the surface unit by making it possible to use a higher wattage unit such as 2,400 watts while at the same time providing a low minimum setting. This would merely be a matter of shaping the cam 93 to allow the heating element 14 to descend gradually as the selector switch 12 is moved into its WARM and SIMMER positions thereby causing the heating element to operate less and less efficiently which will account for a lower temperature in the cooking utensil 58. This gives a higher high temperature and a lower low temperature over standard heating units. The cam 93 is shown in detail in FIG. 4 with a vertical OFF position, a first arc A formed by a 45° angle during which the heating unit is being lifted into contact with the utensil until it reaches a HI HEAT position. Then there is an extended circular arc B of about 180° during which the heating unit remains in contact with the utensil until it reaches a LOW setting. Then there is a 90° arc C during which the heating unit gradually drops from contact with the utensil until it reaches a WARM position. The last 45° arc D denotes when the heating unit is spaced away from the utensil.

Modifications of this invention will occur to those skilled in this art, therefore, it is to be understood that this invention is not limited to the particular embodiments disclosed, but that it is intended to cover all modifications which are within the true spirit and scope of this invention as claimed.

What is claimed as new and desired to be secured by Letters Patent of the United States is:

1. A surface heating unit system comprising a metal sheathed resistance heating element of coiled configuration having electrical terminal means extending downwardly therefrom, a heating element support framework carrying the element and being attached thereto, hinging means associated with the heating element and adapted for attaching the heating unit in an opening in a supporting cooktop and for allowing the heating unit to be hinged upwardly for cleaning food spills from therebeneath, a trim ring surrounding the heating element and adapted to be seated within the said opening, a utensil support framework positioned between the coils of the heating element and supported from said trim ring, said heating element support framework being supported by the trim ring for relative vertical movement between an upper position wherein the top surface of the heating element is generally flush with the top surface of the said utensil support framework and a lower position spaced beneath the said top position, and an electrical switching means adapted for controlling the flow of current to the said heating element, and a vertically adjustable finger positioned beneath the heating element and supporting the same in its top position in an area remote from the said hinging means, and a cable member joining the said switching means with the said finger whereby the movement of the said switching means to its OFF position causes the finger to drop thereby lowering the heating element.

2. A surface heating unit system as recited in claim 1 wherein the said electrical switching means includes cam means cooperating with an adjustable anchoring means for changing the position of the said cable member to affect the position of the said finger and hence the elevation of the said heating element.

3. A surface heating unit system as recited in claim 1 wherein the said cable member is a push-pull cable device, whereby the heat flow from the heating element to a utensil carried on the utensil support framework would be substantially reduced upon setting the said electric switching means to its OFF position.

4. A hinged surface heating unit system comprising a metal sheathed resistance heating element of coiled configuration with electrical terminal means extending outwardly therefrom, hinging means associated with the heating element and adapted for attaching the heating unit in a recess in a supporting cooktop and for allowing the heating element to be pivoted upwardly for cleaning food spills therebeneath, a trim ring surrounding the heating element and adapted to be seated within the said recess, a utensil support member separate from the heating element and having a plurality of ring members telescoped between the coils of the heating element and joined together by ribs which are attached to the said trim ring, the heating element being supported on a spider that allows the heating element to move vertically with respect to the utensil support member, and an electrical switching means adapted to control the flow of current to the heating element, an elevator member adapted to underlie the heating element, and a flexible cable means joining the said switching means to the said elevator member so that when the switching means is set to an ON position, the cable acts upon the elevator member to raise the heating element so that its top surface is adapted to contact the underside of a utensil that would be supported on the said utensil support member.

5. A hinged surface heating unit system as recited in claim 4 wherein the said flexible cable means is a push-pull cable that is capable of raising or lowering the elevator member depending on whether the said switching means is set to its ON or OFF position respectively.

6. A raisable surface heating unit system comprising a coiled heating element adapted to be supported in an opening in a cooktop, and means for raising the heating element for cleaning food soils therebeneath, a trim ring surrounding the heating element and adapted to be seated within the said opening, a utensil support member having a plurality of ring members that are each telescoped between adjacent turns of the heating element, and ribs joining the ring members together and supporting the rings from the said trim ring, the heating element being supported on an open frame, and slots formed in the top edge of the utensil support ring members to accommodate portions of the said frame therein so as to allow the heating element to move vertically with respect to the utensil support member, and an electrical switching means adapted to control the flow of current to the heating element, an elevator member adapted to underlie the heating element, and a flexible cable joining the said switching means to the said elevator member so that when the switching means is set in an ON position, the cable acts upon the elevator member to raise the heating element so that its top surface is adapted to substantially contact the underside of a utensil that would be supported on the said utensil support member.

7. A raisable surface heating unit system as recited in claim 6 wherein the said flexible cable means is a push-pull cable that is capable of raising or lowering the elevator member depending upon whether the said switching means is set to its ON or OFF position respectively.

8. A raisable surface heating unit as recited in claim 6 wherein the heating unit is adapted to be slightly spaced from the utensil when the selector switch is set in a low heat position so that the thermal losses incurred due to lack of contact between the members would result in a very low heat setting.

* * * * *